(12) United States Patent
Adler et al.

(10) Patent No.: US 8,920,538 B2
(45) Date of Patent: Dec. 30, 2014

(54) COMPRESSION OF MEDIA

(75) Inventors: Robert Adler, Gerasdorf (AT); Sascha Dorner, Vienna (AT); Georg Siebert, Vienna (AT); Martin Stehrlein, Rust (AT)

(73) Assignee: Linde Aktiengesellschaft, Munich (DE)

( * ) Notice: Subject to any disclaimer, the term of this patent is extended or adjusted under 35 U.S.C. 154(b) by 217 days.

(21) Appl. No.: 13/468,484

(22) Filed: May 10, 2012

(65) Prior Publication Data

US 2013/0125743 A1 May 23, 2013

(30) Foreign Application Priority Data

May 20, 2011 (DE) .................. 10 2011 102 169

(51) Int. Cl.
| | |
|---|---|
| *F04B 19/22* | (2006.01) |
| *F15B 21/04* | (2006.01) |
| *F25B 1/04* | (2006.01) |
| *B01D 53/26* | (2006.01) |
| *C10L 3/10* | (2006.01) |
| *C25B 15/08* | (2006.01) |
| *C25B 1/04* | (2006.01) |

(52) U.S. Cl.
CPC ............... *F04B 19/22* (2013.01); *B01D 53/26* (2013.01); *C10L 3/106* (2013.01); *C25B 15/08* (2013.01); *C25B 1/04* (2013.01); *B01D 2256/16* (2013.01); *B01D 2257/80* (2013.01); *Y02E 60/366* (2013.01); *Y10S 55/17* (2013.01)
USPC ............. 95/39; 55/DIG. 17; 62/619; 62/401; 62/402; 62/403; 62/498; 137/565; 137/18; 417/313; 417/243; 418/41; 418/83; 418/84; 418/85; 418/101; 418/181

(58) Field of Classification Search
CPC ............... B01D 53/26; B01D 2256/16; B01D 2257/80; C10L 3/106; C25B 1/04; C25B 15/08; F04B 19/22; Y02E 60/366
USPC ............. 95/39, 288; 55/DIG. 17; 62/619, 401, 62/402, 403, 172, 115, 498; 137/565.18; 417/313, 243; 418/41, 83, 84, 85, 86, 418/101, 181
See application file for complete search history.

(56) References Cited

U.S. PATENT DOCUMENTS

| | | | | |
|---|---|---|---|---|
| 2,214,368 | A * | 9/1940 | Goldsmith et al. | 95/39 |
| 2,215,497 | A * | 9/1940 | Doczekal | 60/648 |
| 3,091,097 | A * | 5/1963 | Friant | 62/85 |
| 3,226,948 | A * | 1/1966 | Alderson et al. | 62/317 |
| 3,785,755 | A * | 1/1974 | Novak et al. | 418/85 |
| 3,947,146 | A * | 3/1976 | Schuster | 415/1 |
| 4,303,372 | A * | 12/1981 | Caffrey | 415/169.2 |
| 4,362,462 | A * | 12/1982 | Blotenberg | 415/1 |
| 4,417,847 | A * | 11/1983 | Kube | 415/1 |
| 5,282,726 | A * | 2/1994 | Warren | 417/243 |
| 5,785,739 | A * | 7/1998 | Baker | 95/39 |

(Continued)

*Primary Examiner* — Duane Smith
*Assistant Examiner* — Britanny Precht
(74) *Attorney, Agent, or Firm* — Philip H. Von Neida

(57) ABSTRACT

A method and a device for compressing a gas-phase medium, particularly hydrogen or natural gas, in a single-stage or multistage process using at least one piston compressor, wherein the medium may have a water content up to total saturation with water. The medium to be compressed is heated before the compression at least to such point that the water is unable to condense out during the compression process, and the compressed medium undergoes a water separation process.

8 Claims, 1 Drawing Sheet

(56) References Cited

U.S. PATENT DOCUMENTS

| | | |
|---|---|---|
| 7,987,683 B2 * | 8/2011 | Andres .......................... 62/402 |
| 8,465,570 B2 * | 6/2013 | Alban et al. ...................... 95/39 |
| 2004/0042909 A1 * | 3/2004 | Yoshida et al. ............... 417/243 |
| 2004/0179957 A1 * | 9/2004 | Choroszylow et al. ....... 417/313 |
| 2008/0008602 A1 * | 1/2008 | Pozivil et al. ................ 417/243 |
| 2010/0206165 A1 * | 8/2010 | Alban et al. ...................... 95/96 |
| 2011/0120686 A1 * | 5/2011 | Zoch et al. .................... 165/173 |
| 2011/0185896 A1 * | 8/2011 | Sethna et al. ...................... 95/45 |
| 2012/0067205 A1 * | 3/2012 | Pendzich et al. .................. 95/17 |
| 2012/0118011 A1 * | 5/2012 | Terrien et al. ................... 62/619 |
| 2012/0118012 A1 * | 5/2012 | Bailey et al. .................... 62/619 |
| 2013/0118362 A1 * | 5/2013 | Adler et al. ...................... 100/37 |

* cited by examiner

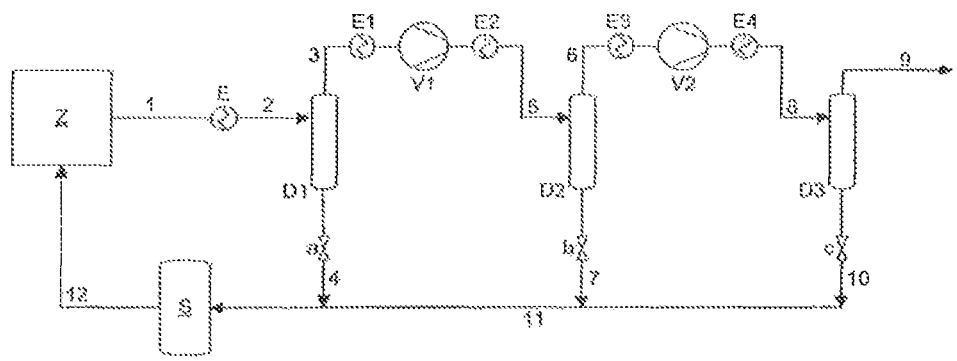

COMPRESSION OF MEDIA

CROSS REFERENCE TO RELATED APPLICATIONS

This application claims priority from German Patent Application No. 102011102169.1, filed May 20, 2011.

BACKGROUND OF THE INVENTION

The invention relates to a method and a device for the single- or multistage compression of a gas-phase medium, particularly hydrogen or natural gas, by means of at least one piston compressor, wherein the medium may have a water content up to total saturation with water.

Species-related compression methods and devices are known sufficiently well from the prior art. Such methods and devices are used for example for compressing gas-phase hydrogen or natural gas. In this context, until now the problem that has presented itself has been that the hydrogen to be compressed inevitably contains water by virtue of the method of its production—by electrolysis for example. Previously, this had to be removed completely before proceeding with the actual compression, because in the compressors of the related art, particularly piston compressors, the compressor valves would be damaged by water droplets or corrosion. For this reason, until now it has been necessary to provide fairly complicated devices or systems for separating the water.

In the case of hydrogen production by electrolysis, for example, molecular sieves are used. However, these need energy because they have to be heated cyclically, and they also consume a portion of the valuable hydrogen, which is used as the purge gas for regenerating the molecular sieve. The necessary separation of the water thus makes hydrogen generation more expensive. Furthermore, devices of such kind require a certain degree of maintenance, which further raises the cost of generating hydrogen.

The same problems are also encountered when compressing other media, such as natural gas for example, which must be compressed for use in refueling vehicles.

The object of the present invention is to suggest a species-related method and a species-related device for compressing a gas-phase medium that avoid the disadvantages outlined in the preceding.

SUMMARY OF THE INVENTION

In terms of the method, the object as stated is solved by warming the medium to be compressed before the compression at least to a point at which water will not condense out during the compression process and subjecting the compressed medium to a water separation process.

The device according to the invention for compressing a gas-phase medium comprises at least one piston compressor, at least one heat exchanger connected upstream of the one or more piston compressors that serves to heat the medium to be compressed, and at least one water separation device connected downstream of the one or more piston compressors.

The invention provides the capability to compress media charged with water using conventional piston compressors for the first time. For this, the medium to be compressed must be heated sufficiently before it is introduced into the piston compressor of multistage compression system. This heating effectively prevents the water contained in the medium to be compressed from being condensed out during the compression process. After it has been compressed to the/an intermediate pressure and/or a final pressure, the compressed medium is cooled down so that the water it contains is condensed out. This water is then separated from the compressed medium using a suitable water separation device.

Unlike the compression method performed previously with a piston compressor, in which every effort is made to introduce the medium or gas to the intake side of the one or more piston compressors in as cold a state as possible, in this method the medium for compression, in a departure from prior practice, is warmed up immediately before the compression.

The degree of warming that the medium for compression is to undergo according to the invention is determined by a multiplicity of factors, such as the pressure, temperature, volume flow and water content of the medium. In the case of multistage compression, heating may take place only before the first compression stage, before each compression stage, or before the first and at least one additional compression stage. Which of these process variants is used will be based in practice on the degree of water separation during, or after, the first compression stage; ideally, almost all of the water should have been separated in the first compression stage.

Further advantageous configurations of the method according to the invention and of the device according to the invention for compressing a gas-phase medium that represent the objects of the dependent claims are characterized in that the compressed medium undergoes a water separation cycle after each compression stage, the medium to be compressed is cooled down before compression or before the first compression stage, and the water that condenses out in this process is separated, a cooling facility is connected before the one or more water separation device(s), and/or a cooling facility and a water separation device connected downstream therefrom are connected before the piston compressor or the first piston compressor.

The method according to the invention and the device according to the invention for compressing a gas-phase medium will be explained in greater detail in the following with reference to the exemplary embodiment represented in the single FIGURE.

BRIEF DESCRIPTION OF THE DRAWINGS

The FIGURE is a diagrammatic representation of an electrolyzer E and a compression unit, comprising three compression stages V1, V2 and V3.

DETAILED DESCRIPTION OF THE INVENTION

The hydrogen generated in electrolyzer Z has a water content of about 8% by volume. In heat exchanger E this stream 1 is cooled against a suitable cooling medium, for example coolant water, and fed via line 2 into a first separator D1. The water that condenses out in separator D1 is drawn off via line 4, in which a control valve a is installed.

The hydrogen that is drawn off at the head of separator D1 via line 3 is heated in heat exchanger E1 against a suitable heating medium at least to the point that it is possible to effectively prevent the water it still contains from condensing out during the subsequent compression in the first stage V1 of the piston compressor system. The water must not be able to condense out during the inflow and compression process inside the piston compressor under any circumstances, because this would damage the piston compressor.

When it has been compressed to the desired intermediate pressure, the compressed hydrogen is cooled against a suitable cooling medium in heat exchanger E2 and forwarded to the second separator D2 via line 5. The water that collects in the sump thereof is transported away via line 7, in which a control valve b is installed.

The hydrogen fraction that is extracted from second separator D2 is transported via line 6 to a further heat exchanger E3, where it is heated up again, against a suitable heating medium to such a point that the water it still contains will be effectively prevented from condensing out during the subsequent compression in second stage V2 of the piston compressor system. The precompressed medium is fed into second stage V2 of the piston compressor system, and here it is compressed to the desired final pressure. It should be emphasised that the method according to the invention may be performed regardless of the selected number of compression stages.

Then, the compressed hydrogen is cooled against a suitable cooling medium in heat exchanger E4 and fed to the third separator D3 via line 8. As before, the water that collects in the sump of this separator D3 is drawn off via line 10, in which a control valve c is installed, and returned via collector line 11, which also collects water fractions 4 and 7 from the first two separators D1 and D2, to an intermediate storage tank S, which may have to be provided. Intermediate storage tank S serves to smooth the flow of water, which is then returned to electrolyzer E via line 12. Since this water is demineralised, it may be fed straight back into electrolyzer E, thus resulting in savings in terms of the water treatment for electrolyzer E.

The compressed hydrogen stream is drawn off via line 9 at the head of third separator D3 and forwarded to its subsequent application. The fraction of residual water in hydrogen stream 9 is below the required limit values. In this context, the concentration of water in hydrogen stream 9 may be adjusted using the temperature(s) of the coolant medium or media and/or the pressure stage ratios of the compressor stages implemented.

The energy required to heat the medium for compression in heat exchangers E1 and E3 is preferably supplied by the compression energy extracted in heat exchangers E2 and E4 that are connected downstream from compression stages V1 and V2. However, other forms of energy or heat supply may also be implemented in addition or alternatively thereto.

The method and the device according to the invention for compressing a gas-phase medium enable conventional compression technologies to be used for media that are "contaminated" with water. The heating or overheating of the medium that is to be carried out (immediately) before the compression and the reduced displacement output and associated loss of effectiveness this entails are more than compensated for by the advantages offered by the invention, such as the usability of standard compressor components, simplification of the electrolysis supply system and so on.

What we claim is:

1. A method for the single- or multistage compression of a gas-phase medium by means of at least one piston compressor, wherein the medium may have a water content up to total saturation with water, comprising, heating, the medium to be compressed before compressing at least to such a point that the water is effectively unable to condense out during the compressing, and separating water from the compressed medium.

2. The method as recited in claim 1, wherein said gas-phase medium is selected from the group consisting of hydrogen and natural gas.

3. The method as recited in claim 1, wherein the water separating of the compressed medium occurs after each compression stage.

4. The method as recited in claim 1, wherein the medium to be compressed is cooled after heating and before compression or the first compression stage and the water that condenses out is separated.

5. A device for the compression of a gas-phase medium wherein the medium may have a water content up to total saturation with water, and wherein the medium is compressed in a single or multiple stages using at least one piston compressor, comprising at least one piston compressor, at least one heat exchanger that is connected upstream of the one or more piston compressors and serves to heat the medium to be compressed, and at least one water separation device connected downstream of the one or more piston compressors.

6. The device as recited in claim 5 wherein said gas-phase medium is selected from the group consisting of hydrogen and natural gas.

7. The device as recited in claim 5, characterized in that a cooling facility is connected upstream of the one or more water separation devices.

8. The device as recited in claim 5, characterized in that a cooling facility and a water separation device connected downstream therefrom are connected upstream of the piston compressor or the first piston compressor and downstream from the heat exchanger.

* * * * *